(12) United States Patent
Allam et al.

(10) Patent No.: US 7,736,692 B2
(45) Date of Patent: Jun. 15, 2010

(54) PROCESS FOR APPLYING AN ADHESION PRIMER TO A WINDOW

(75) Inventors: Dominic J. Allam, Canton, MI (US); Andrew R. Kneisel, Clarkston, MI (US); Syed Z. Mahdi, Rochester Hills, MI (US)

(73) Assignee: Dow Global Technologies Inc., Midland, MI (US)

( * ) Notice: Subject to any disclaimer, the term of this patent is extended or adjusted under 35 U.S.C. 154(b) by 1225 days.

(21) Appl. No.: 10/458,951

(22) Filed: Jun. 11, 2003

(65) Prior Publication Data

US 2003/0232152 A1 Dec. 18, 2003

Related U.S. Application Data

(60) Provisional application No. 60/388,088, filed on Jun. 12, 2002.

(51) Int. Cl.
*B05D 5/06* (2006.01)
(52) U.S. Cl. .................. 427/165; 427/421.1; 427/299; 427/596
(58) Field of Classification Search .............. 427/421, 427/422, 596
See application file for complete search history.

(56) References Cited

U.S. PATENT DOCUMENTS 4,525,511 A    6/1985  Kirby et al.
5,238,993 A    8/1993  Hsieh
5,684,664 A *  11/1997 Julke et al. ............... 361/117
5,792,811 A    8/1998  Bhat

FOREIGN PATENT DOCUMENTS

JP        62105715    *  5/1987

OTHER PUBLICATIONS

International Search R port, PCT/US 03/19745, attached.
Derwent Abstract (attached hereto) of Japanese Patent Application JP-03149273 A.
U.S. Appl. No. 09/553,235, filed Apr. 19, 2000.

* cited by examiner

*Primary Examiner*—David Turocy
(74) *Attorney, Agent, or Firm*—Timothy S. Stevens

(57) ABSTRACT

A process for applying an adhesion primer to a window. The process includes the steps of directing light (11) onto the window (10) to illuminate a portion (13) of the window and then applying an adhesion primer along the illuminated portion of the window. If the adhesion primer contains a component that evaporates, then the process can further include the step of forming an infrared image (19) of the window as the component evaporates to indicate the area of application (20) of the adhesion primer. If the adhesion primer contains a component that fluoresces when illuminated by ultraviolet light, then the process can further include the step of illuminating the window with ultraviolet light (22) to indicate the area of application (23) of the adhesion primer.

7 Claims, 2 Drawing Sheets

PROCESS FOR APPLYING AN ADHESION PRIMER TO A WINDOW

RELATED APPLICATION

The instant application claims the benefit of U.S. Provisional Patent Application No. 60/388,088 filed Jun. 12, 2002.

FIELD OF THE INVENTION

The instant invention relates to a process for applying an adhesion primer to a window, the adhesion primer to increase the bond strength between the glass of the window and an adhesive or polymer molded to the window, or to increase the bond strength between a paint film on the window and an adhesive or to increase the bond strength between a polymer molded on the window and an adhesive.

BACKGROUND

As discussed in U.S. Pat. No. 5,792,811, the fixed glass windows (such as the windshield) of a modern automobile are bonded to the painted steel body of the automobile using an adhesive (such as a urethane adhesive). The periphery of the window is usually already coated with black cosmetic paint called the "enamel band". A primer is applied to the enamel band along the area of the window to be bonded to the automobile to improve the strength of the bond between the enamel band and the cured adhesive.

The area of the enamel band to be primed can be controlled using a mechanical means, such as an edge guide or a template. Alternatively, the area of the enamel band to be primed can be indicated by a pattern printed or otherwise marked on the enamel band. If the primer is applied robotically, then the robot can be programmed to apply the primer to the desired area of the enamel band.

The primer is often not visually detectable after it has been applied to the enamel band. Thus, it is difficult to determine if an area of the enamel band requiring the primer has been properly primed. It would be an advance in the art of applying an adhesion primer to the enamel band of such a window if a process were developed that indicated the area to be primed and then confirmed that such area had been primed.

SUMMARY OF THE INVENTION

The instant invention provides an improved process for applying an adhesion primer to a window. In addition, the instant invention also provides an improved process for confirming that such area has been primed. More specifically, the instant invention is a process for applying an adhesion primer to a window, comprising the steps of: (a) directing light onto the window to illuminate a portion of the window; (b) applying an adhesion primer along the illuminated portion of the window. If the adhesion primer contains a component that evaporates, then the process can further include the step of forming an infrared image of the window as the component evaporates to indicate the area of application of the adhesion primer. If the adhesion primer contains a component that fluoresces when illuminated by ultraviolet light, then the process can further include the step of illuminating the window with ultraviolet light to indicate the area of application of the adhesion primer.

DETAILED DESCRIPTION OF THE INVENTION

Figure 1:
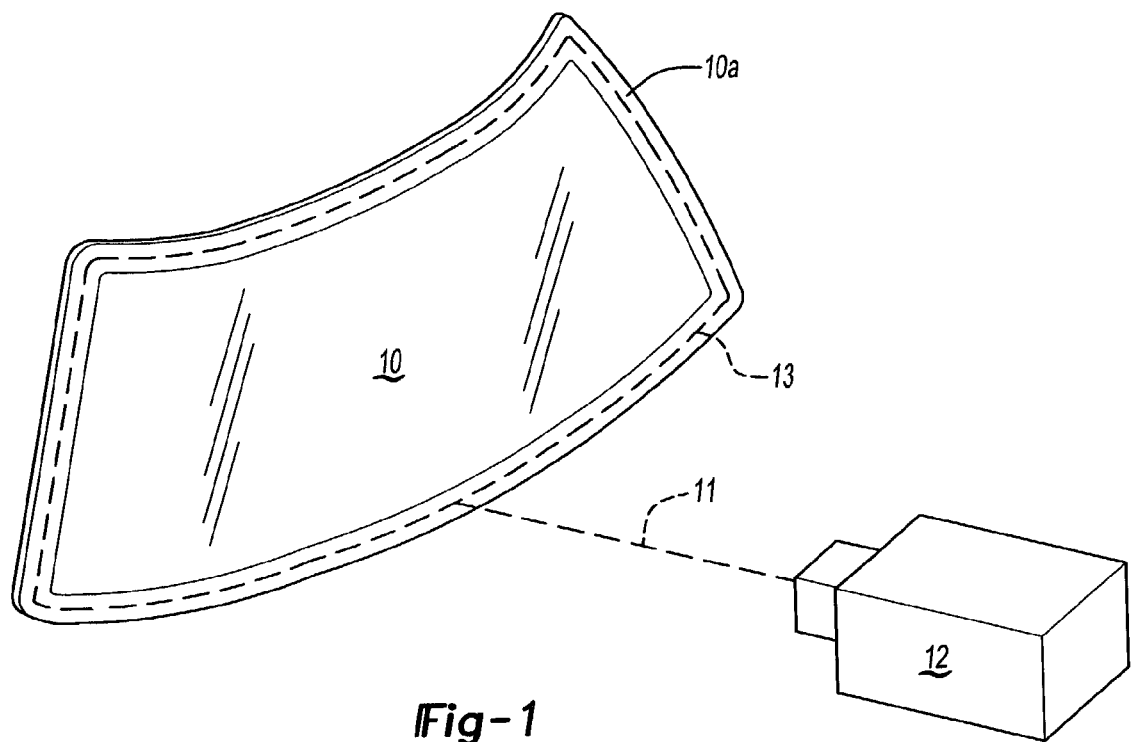
FIG. 1 shows a vehicle windshield being repeatedly scanned with a beam of light to form a luminous line near the edge of the windshield.

Referring now to FIG. 1, therein is shown a vehicle windshield 10. The periphery of the windshield 10 is coated with a black cosmetic paint band 10a called the "enamel band". The window 10 is being repeatedly scanned with a beam of light 11 from a laser light scanner 12. The laser light scanner 12 repeatedly scans the band 10a of the windshield 10 to form a luminous line 13 on the band 10a.

Figure 2:
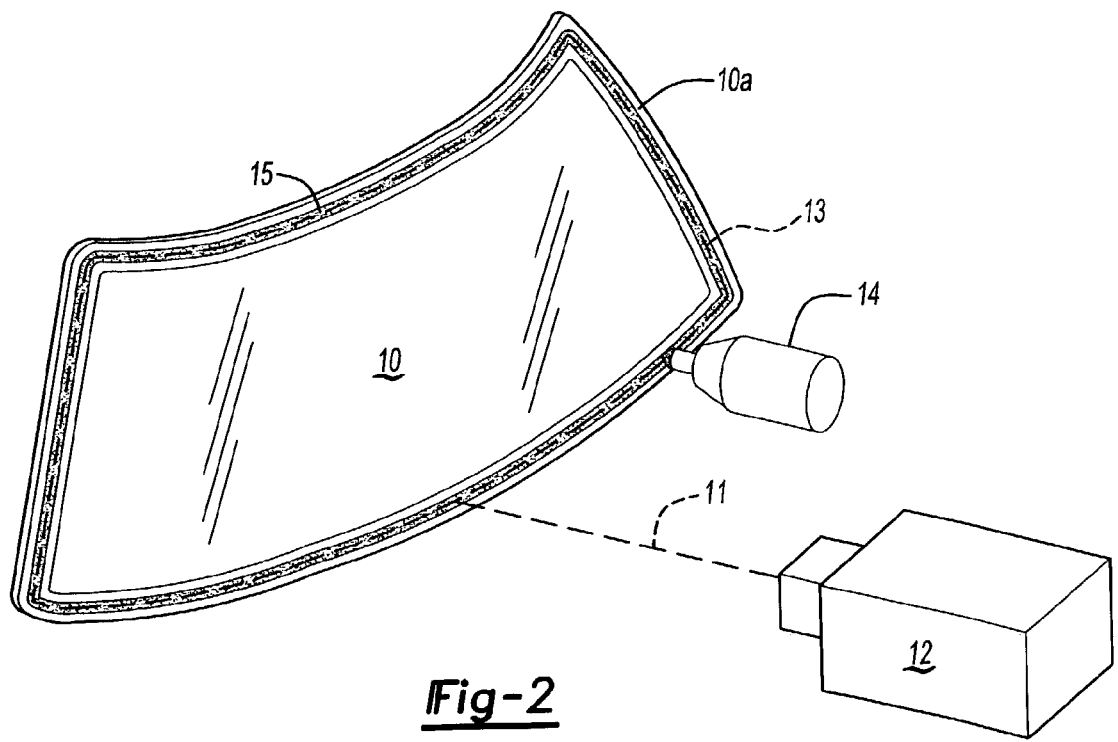
FIG. 2 shows an adhesion primer being applied to the vehicle windshield of FIG. 1 along the luminous line.

Referring now to FIG. 2, therein is shown the vehicle windshield, the beam of light 11, the laser light scanner 12 and the luminous line 13 of FIG. 1. An adhesion primer applicator 14 is shown being used to apply a band 15 of an adhesion primer along the luminous line 13. The applicator 14 can be manually manipulated or the applicator 14 can be manipulated by a robot programmed to follow the line 13.

Figure 3:
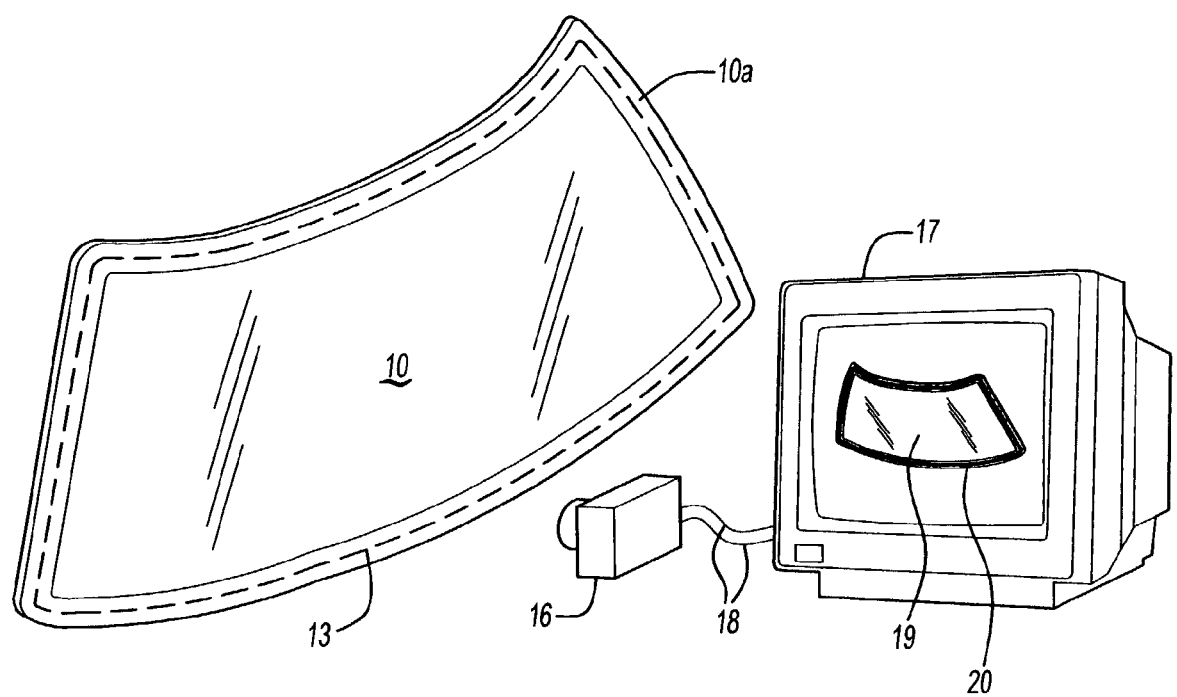
FIG. 3 shows a vehicle windshield being inspected with an infrared imaging system.

Referring now to FIG. 3, therein is shown the windshield 10 of FIG. 2 after the adhesion primer has been applied. The adhesion primer contains a solvent that evaporates after the adhesion primer has been applied. The evaporation of the solvent cools the area of the windshield 10 where the adhesion primer was applied. An infrared camera system 16, electrically connected to a monitor 17 by wires 18, is directed at the windshield 10 to form an infrared image 19 of the windshield 10. The infrared image 19 of the windshield 10 shows the band of drying adhesion primer as a region 20 of the infrared image 19 of lower temperature. The infrared imaging system shown in FIG. 3 is used as a quality control check to confirm the proper application of the adhesion primer.

Figure 4:
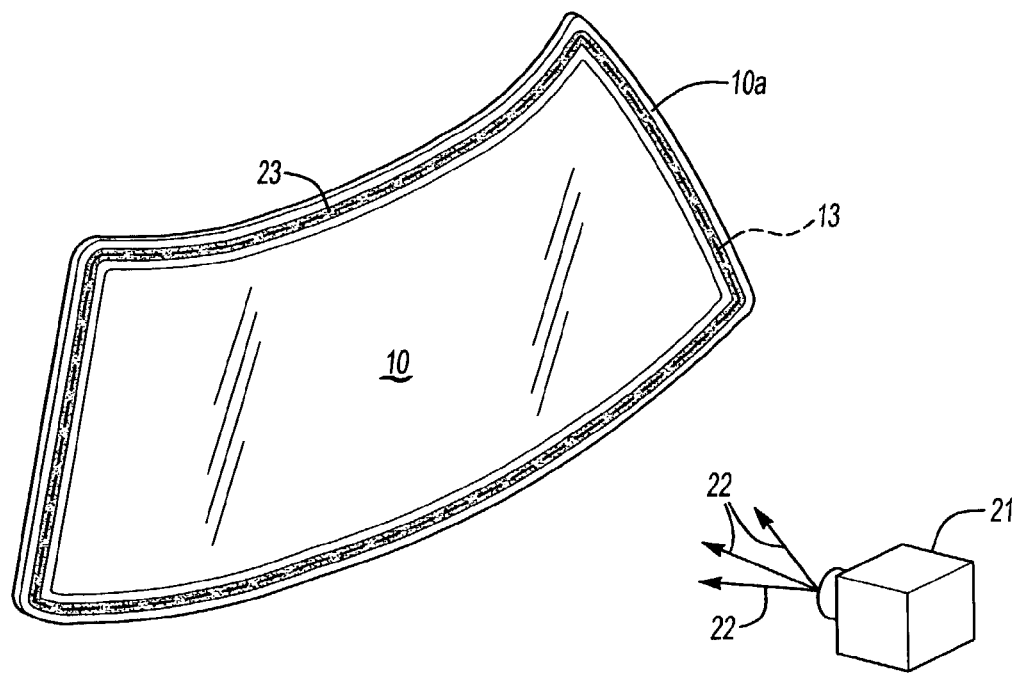
FIG. 4 shows a vehicle windshield being illuminated by ultraviolet light.

Referring now to FIG. 4, therein is shown the windshield 10 of FIG. 2 after the adhesion primer has been applied. The adhesion primer contains a fluorescing component that fluoresces when illuminated by ultraviolet light. A source of ultraviolet light 21 is used to direct ultraviolet light 22 at the windshield 10 causing the fluorescing component of the band of adhesion primer on the windshield 10 to fluoresce and be apparent as a region 23 on the windshield 10. The ultraviolet illuminating system shown in FIG. 4 is used as a quality control check to confirm the proper application of the adhesion primer.

Referring again to FIG. 1, the laser light scanner 12 can be the system described in PCT Patent Application WO 01/82634 A2 (PCT/US01/12751 claiming priority to U.S. patent application Ser. No. 09/553,235 filed Apr. 19, 2000). Such a laser light scanner can be readily programmed to scan a contoured glass object such as a vehicle windshield. However, it should be understood that any suitable system can be used to direct light onto the glass object to illuminate and make apparent the portion of the glass object to be treated. For example, a digital "slide show" projector can be used in combination with a general purpose digital computer programmed, for example, in Microsoft PowerPoint brand projection software, such a combination configured to illuminate the desired portion of the window to be treated with the adhesion primer. An additional important benefit of the instant invention is the capability of projecting a unique indicia (such as an array of dots or other geometric shapes) at various points on the enamel band of a window to correspond with indicia printed or otherwise indicated on the enamel band of the window (such as by a void in the enamel band) to confirm proper location of the window relative to the light projector or scanner and/or to confirm the proper specification of the window to be primed.

Much of the description above related to the application of an adhesion primer to a vehicle windshield. However, it should be understood that other glass treatments can be used in the instant invention. For example, the glass treatment can be cleaning to remove, for example, oil and grease. The glass object to be treated can be of any shape. An adhesion primer is defined herein as a composition that is applied to the enamel band (or to bare glass) to increase the strength of the bond between the enamel band (or the bare glass) and the cured adhesive as determined by SAE test J 1529 or ASTM test D 1002.

The glass object to be treated can also be "encapsulated", for example a window having a polymer molded to the window at the periphery of the window. The window can be treated according to the instant invention with an adhesion primer to increase the strength of the bond between the glass and the cured polymer. Thus, the term adhesion primer is also defined herein as a composition that is applied to the window to increase the strength of the bond between the glass and the cured polymer as determined by SAE test J 1529 or ASTM test D 1002. And, the exposed cured polymer portion of an encapsulated window can then in turn be treated according to the instant invention with an adhesion primer to increase the strength of the bond between the cured polymer and an adhesive used to bond the encapsulated window to an automobile body. Thus, the term adhesion primer is also defined herein as a composition that is applied to at least a portion of the cured polymer of an encapsulated window to increase the strength of the bond between the cured polymer and the cured adhesive as determined by SAE test J 1529 or ASTM test D 1002.

The specific infrared imaging system and the specific ultraviolet light illuminating system used are not critical in the instant invention. The infrared imaging system and the ultraviolet light illuminating system of the instant invention are readily available from numerous sources, for example Edmund Industrial Optics, Barrington, N.J. (USA). As a specific example, the infrared imaging system can be the Model 760 system available from Inframetrics, Inc., Billerica, Mass. (USA). The ultraviolet light illuminating system can be a Blak-Ray brand model B 100A ultraviolet lamp assembly available from the Entela Co., Upland, Calif. (USA).

Fluorescing components are readily available from numerous sources, for example Aldrich Chemical Co., Milwaukee Wis. As a specific example, the fluorescing component can be Uvitex OB brand fluorescing agent available from Ciba Specialty Chemicals, Tarrytown, N.Y. (USA). The amount of fluorescing agent added to the adhesion primer must be sufficient so that the area of the window treated with the primer is apparent when the window is illuminated with the ultraviolet light. As a specific example, Betaseal 43518 brand adhesion primer available from The Dow Chemical Company, Midland, Mich. (USA) can contain 0.05 weight percent of Uvitex OB brand fluorescing agent. The specific evaporating solvent used in the adhesion primer is not critical in the instant invention as long as the solvent evaporates at a rate sufficient to cause a degree of cooling sufficient to be detectable using the infrared imaging system. As a specific example, Betaseal 43518 brand adhesion primer available from The Dow Chemical Company, Midland, Mich. (USA) already contains such a solvent.

EXAMPLE 1

A Kodak DCS Pro 14n model digital camera and a Sony model SVGA VPL-CS1 LCD projector are mounted above an adhesive application workstation. The protective packaging is removed from a quarter glass widow for a 2003 Ford Mustang (Harmon Auto Glass, Minneapolis, Minn. (USA)) and the window is positioned on the locator jig of the workstation. A general purpose digital computer equipped with an Intel Pentium 4 brand processor, programmed with Microsoft Windows XP brand operating system and Windows PowerPoint brand projection software, is connected to the projector and the camera. The image from the digital camera is downloaded into the computer and used to program the Windows PowerPoint brand projection software to project a ten point green line around the periphery of the window where it is desired to apply an adhesion primer to the window.

A Dow Automotive aftermarket replacement glass wool dauber (available from The Dow Chemical Company, Midland, Mich. (USA)) is saturated with Dow Betaseal 43518 brand clear adhesion primer and used to manually apply the primer along the line projected on the window. The primed area of the window is then wiped with a lint-free cloth and Dow Betaseal 43520A brand blackout primer is applied along the line projected on the window using a two and one half centimeter wide natural hair brush. Then, Dow Betaseal 57302 brand adhesive is applied along the line projected on the window using a Milwaukee model 6550-20 caulking gun (available from Milwaukee Tool Works, Brookfield, Wis. (USA)). The window is removed from the workstation and bonded to the quarter glass window opening of a 2003 Ford Mustang.

EXAMPLE 2

A Kodak DCS Pro 14n model digital camera, a Sony model SVGA VPL-CS1 LCD projector and a Blak-Ray model B 100A UV lamp are mounted above an adhesive application workstation. The protective packaging is removed from a quarter glass widow for a 2003 Ford Explorer SUV (Harmon Auto Glass, Minneapolis, Minn. (USA)) and the window is positioned on the locator jig of workstation. A general purpose digital computer equipped with an Intel Pentium 4 brand processor, programmed with Microsoft Windows XP brand operating system and Windows PowerPoint brand projection software, is connected to the projector and the camera. The image from the digital camera is downloaded into the computer and used to program the Windows PowerPoint brand projection software to project a ten point green line around the periphery of the window where it is desired to apply an adhesion primer to the window.

Twenty five milligrams of Uvitex OB brand fluorescing agent (Ciba Geigy) is mixed with one hundred grams of Dow Betaseal 43518 brand clear adhesion primer and manually applied along the line projected on the window. The primed area of the window is apparent by the blue-white florescence of the primed area. Dow Betaseal 57302 brand adhesive is applied along the line projected on the window using a Milwaukee model 6550-20 caulking gun. The window is removed from the workstation and bonded to the quarter glass window opening of a 2003 Ford Explorer.

EXAMPLE 3

Kodak DCS Pro 14n model digital camera, a Sony model SVGA VPL-CS1 LCD projector and An Inframetrics Model 760 infrared camera system are mounted above an adhesive application workstation. A windshield for a 2003 Ford F250 pickup truck (Harmon Auto Glass, Minneapolis, Minn. (USA) is positioned on the locator jig of an adhesive application workstation. A general purpose digital computer equipped with an Intel Pentium 4 brand processor, programmed with Microsoft Windows XP brand operating system and Windows PowerPoint brand projection software, is connected to the projector and the camera. The image from the digital camera is downloaded into the computer and used to program the Windows PowerPoint brand projection software to project a ten point green line around the periphery of the windshield where it is desired to apply an adhesion primer to the windshield.

Dow Betaseal 43518 brand clear adhesion primer is manually applied along the line projected on the windshield. The primed area of the windshield is apparent in the monitor of the infrared camera system by the color change of the primed area as the primer dries (especially when using the image subtraction feature of the infrared camera system). Dow Betaseal 57302 brand adhesive is applied along the line projected on the windshield using a Milwaukee model 6550-20 caulking gun. The windshield is removed from the workstation and bonded to the windshield opening of a 2003 Ford F250 pickup truck.

What is claimed is:

1. A process for applying an adhesion primer (15) to a window (10), comprising the steps of: (a) directing light (11) onto the window (10) to illuminate a portion (13) of the window (10); (b) applying an adhesion primer (15) along the illuminated portion of the window (10).

2. The process of claim 1, wherein step (a) comprises repeatedly scanning a beam of light (11) onto the window (10) at a repetition rate sufficient to apparently form a luminous line (13) on the window (10).

3. The process of claim 2, wherein the beam of light (11) is a laser beam.

4. The process of claim 1, wherein the adhesion primer contains a component that evaporates and wherein the process further includes the step of forming an infrared image (19) of the window as the component evaporates to indicate the area of application (15) of the adhesion primer.

5. The process of claim 3, wherein the adhesion primer contains a component that evaporates and wherein the process further includes the step of forming an infrared image (19) of the window as the component evaporates to indicate the area of application (15) of the adhesion primer.

6. The process of claim 1, wherein the adhesion primer contains a component that fluoresces when illuminated by ultraviolet light and wherein the process further includes the step of illuminating the window with ultraviolet light (22) to indicate the area of application (23) of the adhesion primer.

7. The process of claim 3, wherein the adhesion primer contains a component that fluoresces when illuminated by ultraviolet light and wherein the process further includes the step of illuminating the window with ultraviolet light (22) to indicate the area of application (23) of the adhesion primer.

* * * * *